INVENTOR.
HARRY B. WATTSON
BY
AGENT

Aug. 25, 1970            H. B. WATTSON            3,525,921
APPARATUS FOR CONVERTING AN ALTERNATING CURRENT SUPPLY
VOLTAGE INTO A DIRECT CURRENT OUTPUT
Filed Dec. 15, 1966            2 Sheets-Sheet 2

INVENTOR.
HARRY B. WATTSON
BY
AGENT

United States Patent Office 3,525,921
Patented Aug. 25, 1970

1

3,525,921
APPARATUS FOR CONVERTING AN ALTERNATING CURRENT SUPPLY VOLTAGE INTO A DIRECT CURRENT OUTPUT
Harry B. Wattson, Rutherford, N.J., assignor to The Bendix Corporation, a corporation of Delaware
Filed Dec. 15, 1966, Ser. No. 602,024
Int. Cl. H02m 7/00, 7/66
U.S. Cl. 321—18                                    4 Claims

ABSTRACT OF THE DISCLOSURE

An electrical network for converting an alternating current supply voltage into a constant direct current output for driving a load. The supply voltage is applied to a semiconductor and the current flow through the semiconductor is controlled to provide a predetermined output. A regulator is responsive to the predetermined output from the semiconductor for providing the constant direct current output.

CROSS REFERENCE TO RELATED APPLICATIONS

The electrical network of the present invention provides small, light and efficient means for controlling the alternating current supply voltage and enables the implementation of voltage and current protection circuits such as the circuit disclosed and claimed in copending U.S. application Ser. No. 622,871, filed Mar. 8, 1967, and control circuits for redundant power supplies such as the circuit disclosed and claimed in copending U.S. application Ser. No. 594,594, filed Nov. 15, 1966, both of said applications being filed by Harry B. Wattson and assigned to The Bendix Corporation, assignee of the present invention.

FIELD OF THE INVENTION

Flight control systems, industrial control systems and other electrical control systems include power supplies which are responsive to an alternating current supply voltage for providing a direct current driving output. For proper operation of the system the direct current driving output must be at a predetermined level.

DESCRIPTION OF THE PRIOR ART

Heretofore power supplies for electrical control systems have included power transformers for controlling the alternating current supply voltage so that the direct current output provided in response thereto is at the predetermined level. Power transformers are relatively inefficient, have excessive weight and take up considerable space, and are difficult and costly to maintain and replace. Moreover, the range of control depends upon the transformer windings.

SUMMARY OF THE INVENTION

The present invention provides a novel arrangement of semiconductors for controlling the alternating current supply voltage. Although power transistors may be used, the preferred embodiment of the invention employs a silicon controlled rectifier which is the most efficient semiconductor for this purpose.

The alternating current supply voltage is applied to the silicon controlled rectifier, with the current flow through the silicon controlled rectifier being controlled by an alternating current biasing voltage, which biasing voltage is phase shifted relative to the supply voltage. With this arrangement the current flow through the silicon controlled rectifier is controlled instantaneously and over a wide range to provide an output for conversion

2 into the constant direct current driving output at the predetermined level.

One object of this invention is to provide a network for converting an alternating current supply voltage into a constant direct current output at a predetermined level for driving an electrical system, including novel means having reduced weight and size and increased efficiency over the conventional power transformer for controlling the alternating current supply voltage.

Another object of this invention is to control the alternating current supply voltage instantaneously and over a wide range.

Another object of this invention is to provide a semiconductor which is responsive to the alternating current supply voltage, and to control the current flow through the semiconductor so that there is provided thereby an output for conversion into the direct current driving output.

Another object of the invention is to provide a network for converting an alternating current supply voltage into a constant direct current output in which there is utilized a silicon controlled rectifier to reduce the voltage to a power supply regulator in place of a step-down transformer. The silicon controlled rectifier has a high speed switching characteristic and the conduction angle of the silicon controlled rectifier is so controlled as to accomplish the desired voltage output.

Another object of this invention is to provide a control network responsive to the direct current output for shutting off power to the electrical system when the direct current output is above or below a predetermined voltage or current value.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

DESCRIPTION OF THE INVENTION

Figure 1:
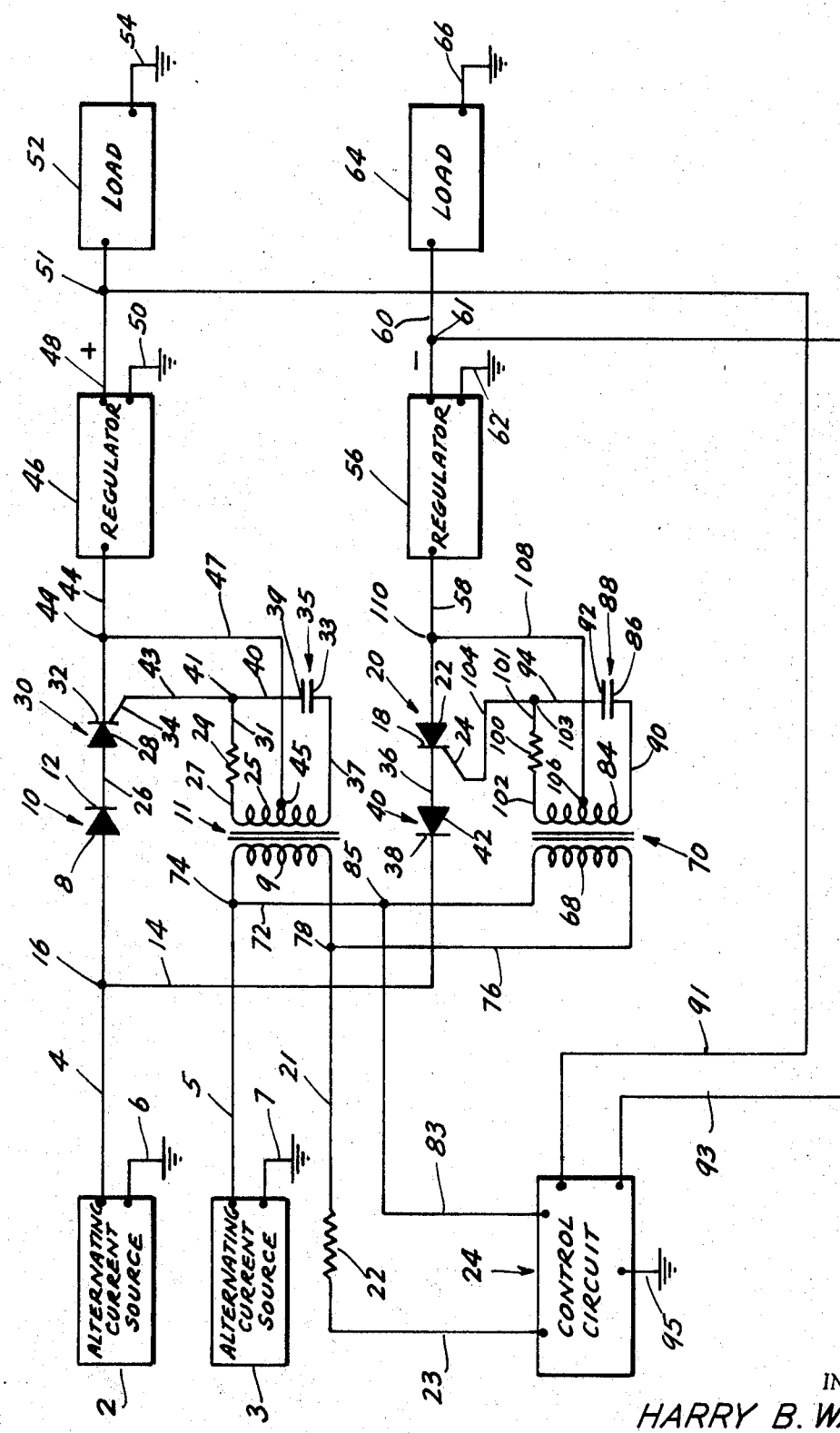
FIG. 1 is an electrical schematic diagram showing a network for converting an alternating current supply voltage into a constant direct current driving output including means according to the invention for controlling the alternating current supply voltage.
Figure 2:
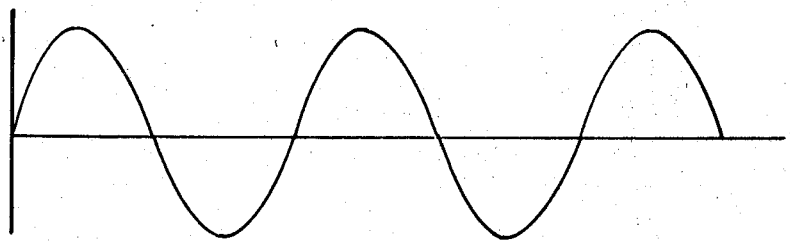
FIG. 2 is a graphical representation showing the waveform of the alternating current supply voltage.

With reference to FIG. 1, there is provided a suitable source of alternating current designated by the numeral 2 and having an output conductor 4 and a grounded output conductor 6, and which alternating current source 2 provides at the output conductor 4 an alternating current supply voltage which for example may be a 110 volt 400 cycle alternating current having a waveform as shown in the graphical representation of FIG. 2 and such as may be used in an electrical control system.

Figure 3:
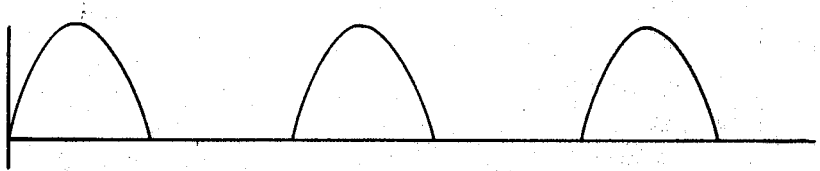
FIG. 3 is a graphical representation showing the waveform of the alternating current supply voltage rectified in accordance with the invention.

The alternating current supply voltage from the alternating current source 2 is applied through the output conductor 4 to an anode 8 of a diode 10, which diode 10 has a cathode 12. There is provided at the cathode 12 an output having a waveform as shown in the graphical representation of FIG. 3. The alternating current supply voltage from the alternating current source 2 is applied through the output conductor 4 and a conductor 14 joining the output conductor 4 at a point 16 to a cathode 38 of a diode 40, which diode 40 has an anode 42.

The cathode 12 of the diode 10 is connected through a conductor 26 to an anode 28 of a silicon controlled rectifier 30, which silicon controlled rectifier 30 has a cathode 32 and a gate 34. The anode 42 of the diode 40 is connected through a conductor 36 to a cathode 18 of a silicon controlled rectifier 20, which silicon controlled rectifier 20 has an anode 22 and a gate 24.

Figure 4:
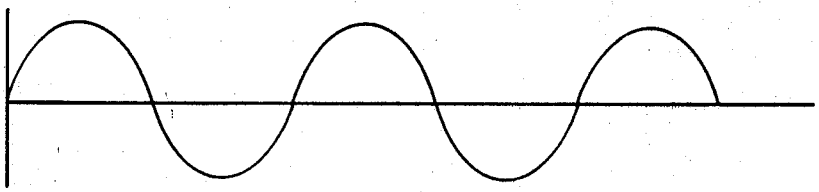
FIG. 4 is a graphical representation showing the waveform of a biasing voltage applied to the semiconductor of the present invention.

A suitable source of alternating current designated by the numeral 3 and having an output conductor 5 and a grounded output conductor 7 provides at the output conductor 5 an alternating current output which may for example be a 26 volt 400 cycle alternating current having a waveform, as shown in the graphical representation of FIG. 4, which output is in phase with the alternating current supply voltage at the output conductor 4 as may be seen by comparing FIGS. 2 and 4. The alternating current output from the alternating current source 3 is applied through the conductor 5 to one leg of a primary winding 9 of a transformer 11, which transformer 11 has a secondary winding 25 inductively coupled to the primary winding 9. The other leg of the primary winding 9 is connected through a conductor 21, a resistor 22 and a conductor 23 to a control circuit 24, as hereinafter explained.

Secondary winding 25 of transformer 11 has one leg connected to the gate 34 of the silicon controlled rectifier 30 through a conductor 27, a resistor 29 and a conductor 31 leading from the resistor 29 and joining at a point 41 a conductor 43 leading to the gate 34 of the silicon controlled rectifier 30. Secondary winding 25 of the transformer 11 has another leg connected through a conductor 37 to a plate 33 of a capacitor 35, which capacitor 35 has another plate 39 connected to the resistor 29 through a conductor 40 leading from the plate 39 and joining at the point 41 the conductor 31 leading from the resistor 29. The secondary winding 25 of the transformer 11 has a center tap terminal 45 which is connected through a conductor 47 to a point 49 on a conductor 44 leading from the cathode 32 of the silicon controlled rectifier 30 to an input terminal of a voltage regulator 46 of a conventional type.

Figure 5:
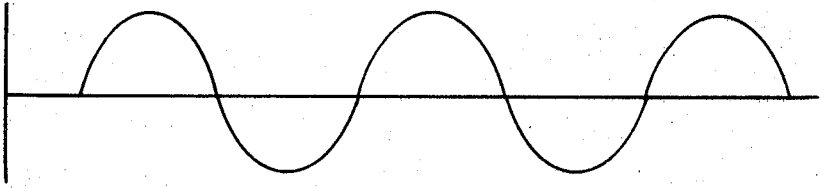
FIG. 5 is a graphical representation showing the waveform of the biasing voltage shown in FIG. 4, phase shifted according to the invention.
Figure 6:
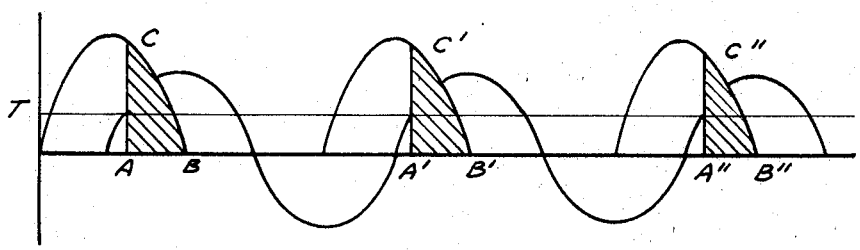
FIG. 6 is a graphical representation wherein the waveform shown in FIG. 5 is superimposed upon the waveform shown in FIG. 3 so as to graphically illustrate the portion of the supply voltage conducted by the silicon controlled rectifier in accordance with the present invention.

The aforenoted arrangement of transformer 11, resistor 29 and capacitor 35 provides a phase shifted biasing voltage having a waveform as shown in the graphical representation of FIG. 5, which phase shifted biasing voltage, applied to the gate 34 of the silicon controlled rectifier 30 through the conductor 43, controls the conduction of the silicon controlled rectifier 30 so that there is provided at the cathode 32 thereof an output in a positive sense and having a waveform as shown in the graphical representation of FIG. 6, said waveform carrying the designations A, B, C; A′, B′, C′; A″, B″, C″, in FIG. 6.

The alternating current output from the alternating current source 3 is applied through a conductor 72 joining the output conductor 5 at a point 74 and leading to one leg of a primary winding 68 of a transformer 70, which transformer 70 has a secondary winding 84 inductively coupled to the primary winding 68.

The other leg of the primary winding 68 of the transformer 70 is connected through a conductor 76 joining the conductor 21 at a point 78 and leading through conductor 21 to the corresponding other leg of the primary winding 9 of the transformer 11.

Secondary winding 84 of the transformer 70 has one leg connected to the gate 24 of the silicon controlled rectifier 20 through a conductor 102, a resistor 100, and a conductor 101 leading from the resistor 100 and joining at a point 103 a conductor 104 leading to the gate 24 of the silicon controlled rectifier 20.

The secondary winding 84 of the transformer 70 has another leg connected through a conductor 90 to a plate 86 of a capacitor 88, which capacitor 88 has another plate 92 which is connected through a conductor 94 to the point 103 on the conductor 101 leading from the resistor 100.

The secondary winding 84 of transformer 70 has a center tap terminal 106 which is connected through a conductor 108 to a point 110 on a conductor 58 leading from the anode 22 of the silicon controlled rectifier 20 to an input terminal of a voltage regulator 56 of a conventional type.

Transformer 70, resistor 100 and capacitor 88 provide a phase shifted biasing voltage which phase shifted biasing voltage is applied through the conductor 104 to the gate 24 of the silicon controlled rectifier 20 so as to control the conduction of the silicon controlled rectifier 20 in such a manner that there is provided at the anode 22 thereof an output in a negative sense which is otherwise similar to the waveform carrying the designations A, B, C; A′, B′, C′ and A″, B″, C″, in FIG. 6.

The cathode 32 of the silicon controlled rectifier 30 is connected through the conductor 44 to the input of the regulator 46. The regulator 46 has an output conductor 48 and a grounded input-output conductor 50, and is responsive to the output at the cathode 32 of the silicon controlled rectifier 30, which output is applied to the regulator 46 through the conductor 44, for providing at the output conductor 48 of the regulator 46 a constant, positive direct current output at a predetermined voltage level, which output is applied through the conductor 48 to a load 52 driven thereby and having a grounded input conductor 54.

The anode 22 of the silicon controlled rectifier 20 is connected through the conductor 58 to the input of the regulator 56. The regulator 56 has an output conductor 60 and a grounded input-output conductor 62, and is responsive to the voltage at the anode 22 of the silicon controlled rectifier 20, which voltage is applied to the regulator 56 through the conductor 58, for providing at the output conductor 60 of the regulator 56 a constant, negative direct current output at a predetermined voltage level, which output is applied through the conductor 56 to a load 64 driven thereby and having a grounded input conductor 66.

The control circuit 24, heretofore noted, is connected intermediate the alternating current source 3 and the primary windings 9 and 68 of the transformers 11 and 70, respectively, through a conductor 83 leading to the circuit 24 from a point 85 to the conductor 72 and which conductor 72 connects corresponding legs of the primary windings 9 and 68, and through the conductor 21, leading to the circuit 24 through the resistor 22 and the conductor 23, and which conductor 21 leads from a point 78 on the conductor 76, and which conductor 76 connects the other corresponding legs of the primary windings 9 and 68. The control circuit 24 may be a control circuit of the conventional type or may be a voltage and current protection circuit such as described and broadly claimed in the aforenoted copending U.S. application Ser. No. 594,594.

The control circuit 24 is energized through the conductor 83 and is responsive to the outputs from the regulator 46 and the regulator 56 which outputs are applied to the control circuit 24 through conductors 91 and 93 and a common grounded input-output conductor 95. The conductor 91 leads from a point 51 on the output conductor 48 of the regulator 46 to one control input terminal to the control circuit 24, and the conductor 93 leads from a point 61 on the output conductor 60 of the regulator 56 to another control input terminal to the control circuit 24. When the output from the regulator 46 across conductors 48-50, or when the output from the regulator 56 across conductors 60-62, is above or below a predetermined voltage or current level indicating a system malfunction, the control circuit 24 provides a controlling output at the conductor 23. The controlling output effectively controls the biasing voltages applied to the silicon controlled rectifiers 30 and 20 so that the silicon controlled rectifiers 30 and 20 are ineffective for conducting the alternating current supply voltage from the alternating current source 2, thus shutting off power to the system.

OPERATION

The alternating current source 2 provides an output having a waveform as shown in the graphical representation of FIG. 2, which output is applied to the diode 10. The diode 10 rectifies the output applied thereto, providing at the cathode 12 thereof an output in a positive sense as shown in the graphical representation of FIG. 3. The output in a positive sense from the diode 10 is applied to the anode 28 of the silicon controlled rectifier 30.

The alternating current source 3 provides an output having a waveform as shown in the graphical representation of FIG. 4. This output is applied to the transformer 11, which transformer 11, in association with the lag network formed by the resistor 29 and the capacitor 35, provides at the conductor 43 a phase shifted biasing output having a waveform as shown in the graphical representation of FIG. 5. This phase shifted biasing output is applied through the conductor 43 to the gate 34 of the silicon controlled rectifier 30.

The operation of the silicon controlled rectifier 30 in response to the output in a positive sense from the diode 10 and in response to the phase shifted biasing voltage provided by the transformer 11, the resistor 29 and the capacitor 35, may be best described with reference to FIG. 6, wherein the graphical representation of the output in a positive sense is superimposed upon the graphical representation of the phase shifted biasing voltage. The silicon controlled rectifier 30 is initially in a nonconductive state. When the phase shifted biasing voltage reaches a predetermined level, said level carrying the designation T, the silicon controlled rectifier 30 is rendered conductive so as to pass that portion of the output in a positive sense from the diode 10 indicated by the shaded part of the waveform of FIG. 6 and carrying the designation A, B, C. Similarly, for each succeeding cycle of the alternating current supply voltage, the silicon controlled rectifier conducts that portion of said supply voltage carrying the designation A', B', C' and A'', B'', C''. The voltage thus conducted by the silicon controlled rectifier 30 is applied to the regulator 46 which filters the voltage and provides at the output conductor 48 thereof a constant, positive direct current output at the average level of the voltage conducted by the silicon controlled rectifier 30.

In a similar manner the silicon controlled rectifier 20, in association with the diode 40, provides a voltage in a negative sense, which voltage is applied to the regulator 56 for providing at the output conductor 60 thereof a constant, negative direct current output at the average voltage level of the voltage conducted by the silicon controlled rectifier 20.

The arrangement of the present invention controls the alternating current supply voltage provided by the alternating current source 2 so that the direct current outputs provided by the regulator 46 and the regulator 56 are at predetermined constant positive and negative direct current levels for driving the load 52 and the load 64. The supply voltage is thus regulated efficiently, instantaneously and over a wide range. Since the voltage control is provided with an arrangement of semiconductors having reduced weight and size and high reliability, the device of the present invention is particularly adaptable for use in flight control systems or other control systems where the aforenoted factors are of primary concern.

The novel arrangement of the present invention enables the implementation of the control circuit 24. When the direct current outputs from either the regulator 46 or the regulator 56 are above or below predetermined voltage or current levels, the control circuit 24 provides a controlling output at the output conductor 23, which controlling output is applied to the primary windings 9 and 68 of the transformers 11 and 70, respectively. The controlling output causes the biasing voltage applied to the silicon controlled rectifiers 30 and 20 to be phase shifted so as to prevent firing of the silicon controlled rectifiers 30 and 20, thereby effectively shutting off power to the system.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. An electrical network for converting an alternating current supply voltage into a constant direct current output for driving a load, comprising:

means for providing an alternating current output, said alternating current output being in phase with the alternating current supply voltage;

means connected to the alternating current output for shifting the phase thereof;

first current flow control means connected to the alternating current supply voltage means and to the phase shifting means and rendered effective by the phase shifted output for conducting a portion of the alternating current supply voltage in one predetermined sense;

second current flow control means connected to the alternating current supply voltage means and to the phase shifting means and rendered effective by the phase shifted voltage for conducting a portion of the alternating current supply voltage in another predetermined sense;

first means connected to the first current flow means and responsive to the voltage conducted thereby for providing a constant direct current output in the one predetermined sense;

second means connected to the second current flow control means and responsive to the voltage conducted thereby for providing a constant direct current output in the other predetermined sense;

said load connected to the first and second means so as to be driven by the constant direct current outputs provided thereby; and control means connected to the first and second means and connected intermediate the alternating current output means and the phase shifting means, and responsive to the direct current outputs from said first and second means when said outputs are above and below predetermined levels for rendering the phase shifted output effective for biasing the first and second current flow control means to block conduction of the supply voltage.

2. An electrical network as described by claim 1 wherein the means connected to the alternating current output for shifting the phase thereof includes:

an inductance element connected to the means for providing an alternating current output; and circuit means including a resistance element and a capacitance element in cooperative relation with the inductance element so as to provide an output in lagging relation to the alternating current output.

3. An electrical network as defined by claim 2, wherein:
the inductance element is a transformer having a primary winding inductively coupled to a secondary winding;
the primary winding is connected to the means for providing an alternating current output; and
the resistance element and the capacitance element are serially connected to the secondary winding.

4. An electrical network as described by claim 1, including:
control means responsive to the constant direct current outputs in the one sense and in the other sense for providing a controlling output; and
the first and second current flow control means being connected to the control means and responsive to the controlling output therefrom when one of said constant direct current outputs varies from a predetermined level so as to be rendered ineffective for conducting the portion of the alternating current supply voltage in the one sense and in the other sense.

References Cited

UNITED STATES PATENTS

| | | | |
|---|---|---|---|
| 3,192,466 | 6/1965 | Sylvan et al. | |
| 3,219,908 | 11/1965 | Zarleng | 321—45 |
| 3,243,711 | 3/1966 | King et al. | |
| 3,259,832 | 7/1966 | Summerer. | |
| 3,337,792 | 8/1967 | Engelson. | |
| 3,348,122 | 10/1967 | Todd | 321—18 |
| 3,348,129 | 10/1967 | Schonholzer. | |
| 3,299,341 | 1/1967 | Corey | 321—47 |
| 3,218,540 | 11/1965 | Jackson | 321—18 |
| 3,241,035 | 3/1966 | Rhyne | 321—18 |
| 3,299,340 | 1/1967 | Deelman | 321—18 |
| 3,311,806 | 3/1967 | Charlwood | 321—18 |
| 3,390,321 | 6/1968 | Plow | 321—18 XR |
| 3,335,353 | 8/1967 | McVey et al. | 321—5 |
| 3,388,312 | 6/1968 | Klein | 321—18 |

W. M. SHOOP, Jr., Primary Examiner

U.S. Cl. X.R.

321—47; 323—22